United States Patent
Duwe

(10) Patent No.: US 11,959,852 B2
(45) Date of Patent: Apr. 16, 2024

(54) METHOD FOR DETERMINING PROPERTIES OF A SAMPLE BY ELLIPSOMETRY

(71) Applicant: Accurion GmbH, Göttingen (DE)

(72) Inventor: Matthias Duwe, Kassel (DE)

(73) Assignee: Park Systems GmbH, Goettingen (DE)

( * ) Notice: Subject to any disclaimer, the term of this patent is extended or adjusted under 35 U.S.C. 154(b) by 211 days.

(21) Appl. No.: 17/418,757

(22) PCT Filed: Jan. 23, 2020

(86) PCT No.: PCT/EP2020/051566
§ 371 (c)(1),
(2) Date: Jun. 25, 2021

(87) PCT Pub. No.: WO2020/152241
PCT Pub. Date: Jul. 30, 2020

(65) Prior Publication Data
US 2022/0065774 A1    Mar. 3, 2022

(30) Foreign Application Priority Data

Jan. 23, 2019    (DE) ..................... 10 2019 101 650.9

(51) Int. Cl.
*G01N 21/21*    (2006.01)
(52) U.S. Cl.
CPC ..... *G01N 21/211* (2013.01); *G01N 2021/214* (2013.01)
(58) Field of Classification Search
CPC ........................ G01N 21/211; G01N 2021/214
(Continued)

(56) References Cited

U.S. PATENT DOCUMENTS 6,741,353 B1    5/2004 Johs
7,768,660 B1    8/2010 Pribil et al.
(Continued)

OTHER PUBLICATIONS

Li Weiqi et al.—"Characterization of curved surface layer by Mueller matrix ellipsometry"—Journal of Vacuum Science & Technology B: Microelectronics and Nanometer Structures, American Institute of Physics, 2 Huntington Quadrangle, Melville, NY 11747, vol. 34, No. 2, Mar. 16, 2016.
(Continued)

*Primary Examiner* — Michael A Lyons
*Assistant Examiner* — Omar H Nixon
(74) *Attorney, Agent, or Firm* — Gerald E. Hespos; Michael J Porco

(57) ABSTRACT

A method for determining properties of a sample (12) by ellipsometry includes positioning the sample (12) in an ellipsometer (10) so that a surface normal (n) of a measurement region of the sample surface is tilted relative to a reference axis (z) of the ellipsometer (10) and measuring a Mueller matrix for the measurement region. The method then includes creating an equation system by equating the measured Mueller matrix and a matrix product formed of: a rotation matrix about an input rotation angle (γ); an isotropic Mueller matrix in normalized NCS form and a rotation matrix about an output rotation angle (−δ). The method then solves the equation system for the parameters representing the sample properties to be determined. The input rotation angle (γ) and the output rotation angle (−δ) are set as parameters independent of one another when setting up the equation system.

10 Claims, 3 Drawing Sheets

(58) Field of Classification Search
USPC .......................................................... 356/445
See application file for complete search history.

(56) References Cited

U.S. PATENT DOCUMENTS

| | | | |
|---|---|---|---|
| 7,800,765 B2 | 9/2010 | Minami et al. | |
| 8,248,607 B1* | 8/2012 | Herzinger | G01N 21/211 |
| | | | 356/369 |
| 2017/0328771 A1* | 11/2017 | Jo | G01J 3/0297 |
| 2020/0116626 A1* | 4/2020 | Hovorka | G01N 21/211 |

OTHER PUBLICATIONS

Toshide Tsuru et al.—"Tilt-ellipsometry of object surface by specular reflection for three-dimensional shape measurement"—Optics Express, vol. 21, No. 5, Mar. 8, 2013—pp. 6625-6632.
Duwe Matthias et al.—"Thin-film metrology of tilted and curved surfaces by imaging Mueller-matrix ellipsometry"—Journal of Vacuum Science & Technology B: Microelectronics and Nanometer Structures, American Institute of Physics, 2 Huntington Quadrangle, Melville, NY 11747, vol. 37, No. 6, Oct. 11, 2019.
Tompkins, H.G., Irene, E.A.: Handbook of ellipsometry; William Andrew Pub.; Springer, Norwich, NY; Heidelberg, Germany (2005)—pp. 59-66.
International Search Report dated May 13, 2020.

* cited by examiner

METHOD FOR DETERMINING PROPERTIES OF A SAMPLE BY ELLIPSOMETRY

BACKGROUND

Field of the Invention

The invention relates to a method for determining properties of a sample by ellipsometry, comprising the steps of:
positioning the sample in an ellipsometer, the surface normal of a measurement region of the sample surface being tilted relative to the reference axis of the ellipsometer,
measuring the Mueller matrix for the measurement region,
creating an equation system, which at least is not underdetermined, by equating the measured Mueller matrix on the one hand and, on the other hand, a matrix product formed of
rotation matrix about an input rotation angle,
an isotropic Mueller matrix in normalized NCS form and
a rotation matrix about an output rotation angle,
solving the equation system for the parameters representing the sample properties to be determined.

Related Art

Such a method is known from W. Li et. al.: Characterization of curved surface layer by Mueller matrix ellipsometry", *Journal of Vacuum Science & Technology B* 34, 020602 (2016); http://dx.doi.org/10.1116/1.4943952.

Ellipsometry, in particular imaging ellipsometry, is a long-established method for determining optical and geometric properties of a sample, especially of thin layers. The determination of the thickness and/or the refractive index of coatings, for example, is a typical subject of ellipsometric investigations, which can be applied, e.g., as part of quality control measures, such as in the production of coated surfaces.

The determination of the sample properties is based on an analysis of the angle-dependent reflection behavior of the sample. In this context, electromagnetic radiation, e.g., a potentially widened laser beam, with a defined polarization state is directed onto the sample, namely onto a partial region of its surface referred to here as the measuring region, and the change in the polarization state of the electromagnetic radiation after interaction with or reflection from the sample is measured. Technically relevant sample properties that can be determined with high precision using this method are, for example, the layer thicknesses of at least semi-transparent layers or of layer systems or the optical or dielectric constants of almost any material.

Ellipsometry is an indirect measurement method whose evaluation is based on model optimization. The measured variables, which differ depending on the method principle, are converted into the ellipsometric transfer variables $\Psi$ (Psi, amplitude information) and $\Delta$ (Delta, phase information), from which the sample properties of interest are determined via a parameterized fit, i.e. by a numerical error minimization method by variation of parameters of a sample model.

The basic principle of ellipsometry and in particular the design of a measuring instrument based on this principle, generally referred to as an ellipsometer, is known to the person skilled in the art. As a representative example, reference is made to DIN 50989-1:2018-01, which also specifies the generally accepted nomenclature used here, especially with regard to the Mueller formalism used here.

A special form of ellipsometry is the so-called imaging ellipsometry. Here, the illuminated measurement region is imaged onto a two-dimensionally resolving detector by means of imaging optics, such that a non-imaging ellipsometric measurement method can be carried out simultaneously for each point of the measurement region, in which each detector pixel acts as a non-imaging detector for the respectively assigned point of the measurement region and the imaging effect results from an ordered synopsis of the detector pixels. Alternatively, imaging ellipsometry can also use illumination that scans the sample surface. In this case, detection is either carried out without imaging with subsequent, ordered compilation of the measurement results, which were determined point-by-point, into so-called maps (this is also referred to as "stitching"), or detection is carried out directly with imaging, i.e. by means of a two-dimensionally resolving detector.

Ellipsometric measurements are always associated with special angle settings. In particular, these are settings of the nominal angle of incidence of the illumination light, the nominal angle of reflection of the detection light, and the polarization angles at the polarizer and the analyzer. The nominal angle of incidence or, respectively, angle of reflection is to be understood as the angular position of the corresponding light in relation to a reference axis of the ellipsometer. The reference axis is the axis to which the ellipsometer is calibrated. Typically, the reference axis is chosen to coincide with the surface normal of a flat sample surface. This, i.e. a flat sample, is also the typical and well-mastered application in the state of the art.

In practice, however, the person skilled in the art is often confronted with the task of having to measure curved surfaces by ellipsometry. A purely exemplary case is the quality control of coatings on—potentially aspherically—curved lenses. For this purpose, the sample is usually measured successively, each time in sections, with the sample being repositioned before each measurement such that its surface normal in the measurement region coincides with the reference axis of the ellipsometer.

For example, U.S. Pat. No. 7,800,756 B2 describes a method in which the sample is positioned with a suitable apparatus such that different locations on the sample are successively correctly aligned with respect to the scanning ellipsometer, i.e. with surface normals congruent with the reference axis of the ellipsometer.

U.S. Pat. No. 6,741,353 B1 describes another method in which the sample also is positioned by motor such that the individual points on the surface are successively correctly aligned. Here, the additional restriction applies that the objects to be measured must have at least one axis of symmetry.

These methods are complex in terms of equipment and their application is slow.

U.S. Pat. No. 7,768,660 B1 describes a method for measuring a coating on the inside of a cylinder. Here, however, the sample is aligned from the outset such that the non-curved axis of the cylinder is parallel to the beam propagation direction. The influence of the second, curved cylinder axis is neglected, since the radius of curvature is considered large in relation to the measurement region.

The generic publication mentioned at the outset discloses a less apparatus-based, but rather mathematical, evaluation-based approach to the ellipsometric measurement of curved surfaces. Here, we will refer to the corresponding method as "method according to Li".

In the method according to Li, the sample to be measured is positioned in an ellipsometer, wherein at least sections of the sample surface are not correctly aligned in the sense explained above. Our further consideration will concentrate on such measurement regions that are tilted in relation to the reference axis.

For such a measurement region, the so-called Mueller matrix is measured. The method behind the abbreviated expression "measuring the Mueller matrix" is known to those skilled in the art and is explained, for example, in Tompkins, H. G., Irene, E. A.: *Handbook of ellipsometry*; William Andrew Pub.; Springer, Norwich, N.Y.; Heidelberg, Germany (2005). Generally speaking, this is an instruction to perform several measurement procedures on the sample in the ellipsometer, each with different settings of nominal polarization angles. The individual measurement results are used in a specified way to build a 4×4 matrix. Here, we will refer to the resulting 4×4 matrix as the "measured Mueller matrix". The term is to be understood broadly in that, for reasons explained in more detail below, at least in the context of the invention, knowledge, i.e. measurement and design, of the complete Mueller matrix is not required, rather knowledge of a partial Mueller matrix is sufficient, provided that at least five matrix elements have their values determined.

The measured Mueller matrix is then used to set up an equation system by equating the measured Mueller matrix with a matrix product explained below. The resulting equation system (comprising up to 16 individual equations) follows from the known rules of matrix multiplication. The background of this measure is the idea that the measured Mueller matrix corresponds to an ideal, i.e. isotropic, normalized and sample-characterizing Mueller matrix, which, as part of the (misaligned) measurement, has been subjected to a coordinate transformation, in particular an input and an output rotation about the same rotation angle $\alpha$ (apart from its sign). Mathematically formulated, the method according to Li follows the approach:

$$M'_{\Delta,\Psi} = M_{out}^{trans} \cdot M_{\Delta,\Psi} \cdot M_{in}^{trans}, \quad (1)$$

where $M_{in}^{trans}$ and $M_{out}^{trans}$ represent the Mueller matrices for the above coordinate transformations on the input side and output side (from the coordinate system of the ellipsometer to the intrinsic system of the sample and vice versa). $M_{\Delta,\Psi}$ is the Mueller matrix of the isotropic sample in its intrinsic system. $M'_{\Delta,\Psi}$ is the measured Mueller matrix.

In this context, the term "intrinsic system of the sample" means the Cartesian coordinate systems on the input side and the output side defined by the respective p and s vectors (parallel and perpendicular polarization components, respectively) and the respective propagation direction of the incident and reflected light beam onto the sample. Analogously, the "intrinsic system of the ellipsometer" corresponds to the intrinsic system of the sample if the sample normal corresponds to the (correct) alignment to which the ellipsometer has been calibrated.

The shape of the normalized (i.e. element $m_{11} \equiv 1$) Mueller matrix of an isotropic sample characterized by the ellipsometric transfer variables $\Delta$ and $\Psi$ and described in the intrinsic system of the sample is known from the literature:

$$M_{\Delta,\Psi} = \begin{pmatrix} 1 & -N & 0 & 0 \\ -N & 1 & 0 & 0 \\ 0 & 0 & C & S \\ 0 & 0 & -S & C \end{pmatrix}, \quad (2)$$

where the parameters N, C, S are defined as $N = \cos 2\Psi$ $C = \sin 2\Psi \cos \Delta$ $S = \sin 2\Psi \sin \Delta$. $\quad (3)$ Following the method according to Li, one forward and one backward rotation by an (unknown) angle $\alpha$ are used for the coordinate transformation of the isotropic Mueller matrix, as mentioned above. A rotation matrix in the Mueller formalism is generally of the form $$M_{in/out}^{trans} = R(\gamma) = \begin{pmatrix} 1 & 0 & 0 & 0 \\ 0 & \cos 2\gamma & \sin 2\gamma & 0 \\ 0 & -\sin 2\gamma & \cos 2\gamma & 0 \\ 0 & 0 & 0 & 1 \end{pmatrix}, \quad (4)$$

as is also known to the person skilled in the art.

In other words, the method according to Li takes the approach:

$$M'_{\Delta,\Psi} = \quad (5)$$

$$\begin{pmatrix} 1 & 0 & 0 & 0 \\ 0 & \cos(-2\alpha) & \sin(-2\alpha) & 0 \\ 0 & -\sin(-2\alpha) & \cos(-2\alpha) & 0 \\ 0 & 0 & 0 & 1 \end{pmatrix} \begin{pmatrix} 1 & -N & 0 & 0 \\ -N & 1 & 0 & 0 \\ 0 & 0 & C & S \\ 0 & 0 & -S & C \end{pmatrix} \begin{pmatrix} 1 & 0 & 0 & 0 \\ 0 & \cos 2\alpha & \sin 2\alpha & 0 \\ 0 & -\sin 2\alpha & \cos 2\alpha & 0 \\ 0 & 0 & 0 & 1 \end{pmatrix}.$$

The resulting equation system is solved following the method according to Li by entering the dependencies—assumed according to a model of the sample—of the equation system variables on the sample parameters of interest, e.g. a layer thickness, and varying the parameters using a numerical error minimization method until the most probable solution of the system is obtained.

The known method provides useful results in special cases of known sample geometries, but is not applicable as a general approach for the measurement of arbitrary sample geometries, especially those whose details are unknown.

From Tsuru, T.: *"Tilt-ellipsometry of object surface by specular reflection for three-dimensional shape measurement"*, Optics Express, Vol. 21, 2013, No. 5, p. 6625-6632. DOI:10.1364/OE.21.006625, a method for 3D measurement of reflective samples is known in which the sample is illuminated with circularly polarized light. The shape of the polarization ellipse of the reflected light is then to be used to infer the position of the surface normal at the illumination location.

SUMMARY

It is the object of the present invention to further develop the known method in such a way that any samples, in particular those whose geometry is unknown in detail, can be measured by ellipsometry.

This object is solved in connection with the features of the generic term of claim 1 in that, when setting up the equation system, the output rotation angle and the input rotation angle are set as parameters independent of one another.

Preferred embodiments are described in the dependent claims.

The basic idea of the present invention, is to break away from Li's dogma of the equality in magnitude of the input and output rotation angles despite its geometrically based plausibility and to assume these parameters to be independent in the equation system. In this context, we denote the input rotation angle as $\gamma$ and the output rotation angle as $-\delta$. In other words, the invention follows the approach $$M'_{\Delta,\Psi} = \begin{pmatrix} 1 & 0 & 0 & 0 \\ 0 & \cos(-2\delta) & \sin(-2\delta) & 0 \\ 0 & -\sin(-2\delta) & \cos(-2\delta) & 0 \\ 0 & 0 & 0 & 1 \end{pmatrix} \begin{pmatrix} 1 & -N & 0 & 0 \\ -N & 1 & 0 & 0 \\ 0 & 0 & C & S \\ 0 & 0 & -S & C \end{pmatrix} \begin{pmatrix} 1 & 0 & 0 & 0 \\ 0 & \cos 2\gamma & \sin 2\gamma & 0 \\ 0 & -\sin 2\gamma & \cos 2\gamma & 0 \\ 0 & 0 & 0 & 1 \end{pmatrix}. \quad (6)$$

This results in surprising consequences.

When solving the equation system on the basis of a model-based error minimization method analogous to the method according to Li, the additional degree of freedom at this location leads to a significantly improved conformance of the measured values with the real values outside those sample geometries for which the method according to Li is also suitable.

Thus, in the context of an imaging variant of the system according to the invention, maps can be created by solving the equation system pixel by pixel, assigning a value of the parameter of interest to each sample point.

The method according to the invention thus has clear advantages, even when applied analogous to the method according to Li. However, the approach according to the invention is also the basis for more advanced embodiments that are completely unknown in the prior art.

Thus, it is provided in a preferred embodiment of the invention that, as part of solving the equation system, the Mueller parameters N, S, C and/or the ellipsometric transfer variables $\Delta$ and $\Psi$ equivalent to these are explicitly calculated. This is readily possible, because the equation system set up is usually overdetermined, at least not underdetermined. It contains five unknowns, namely the parameters N, S, C, $\gamma$, $\delta$, but can include up to 16 equations, depending on the completeness of the measured Mueller matrix. Thus, the ellipsometric transfer variables $\Delta$ and $\Psi$, which are typically the focus of interest in ellipsometry, can be calculated explicitly, even without explicit knowledge of the assumed rotation angles $\gamma$, $\delta$ (a corresponding prior knowledge with unknown sample geometry is even in principle impossible). In this respect, the term "solving the equation system" is to be understood broadly and includes all methods known and potentially still unknown to the person skilled in the art for finding, numerically or analytically, a mathematical direct or indirect solution of the equation system.

Thus, in the context of a imaging variant of the system according to the invention, maps can be created by solving the equation system pixel by pixel, assigning a $\Delta$ or $\Psi0$ value to each sample point.

From the calculated ellipsometric transfer variables $\Delta$ and $\Psi$, as provided in a preferred further development of the invention, optical and/or geometric sample properties can be determined by a numerical error minimization method by varying parameters of a sample model. This corresponds to the usual use of the (arbitrarily determined) ellipsometric transfer variables $\Delta$ and $\Psi$. With the approach according to the invention, such optical and/or geometric sample properties can now also be determined for curved or tilted surfaces in high spatial resolution and with very short measurement times.

In a preferred further development of this embodiment, it is provided that the angle of incidence at which the illumination beam impinges on the surface of the measurement region is used as an additional parameter to be varied as part of the error minimization method. The background can be explained as follows: For the calculated values of $\Delta$ and $\Psi$ it should be noted that these values are generally not identical to the values that would be measured with a correctly aligned sample. This is due to the fact that the values of $\Delta$ and $\Psi$ are generally functions of the angle of incidence of the incident light beam However, the inclination of the sample, by definition, varies the angle of incidence in relation to the case of the correctly aligned sample, such that, in general, also the values of $\Delta$ and $\Psi$ deviate from the correctly aligned case due to the surface inclination. When using a well-calibrated ellipsometer, in the case of the correctly aligned sample, the angle of incidence is known with an instrument-specific accuracy. This value is usually quantitatively included in the calculation result when further using the values $\Delta$ and $\Psi$ in the context of the above-mentioned model-based error minimization method for determining the physical properties of the sample, e.g. a layer thickness or a refractive index. In the case where the values $\Delta$ and $\Psi$ were determined by means of the method according to the invention, it is thus advantageous for a further evaluation to determine, as a variable parameter of an evaluation from the data itself, the deviation from the nominal angle of incidence, which was set during the measurement at the ellipsometer (or—alternatively—to determine it additionally by any other method).

As explained, the (unknown) rotation angles $\gamma$ and $-\delta$, which are introduced with the method according to the invention, primarily represent only auxiliary variables for evaluation, the quantitative knowledge of which is not required for the determination of the ellipsometric transfer variables $\Delta$ and $\Psi$, which are conventionally the focus of interest. In a favorable variant only made possible by the invention, it is nevertheless provided that the input rotation angle $\gamma$ and the output rotation angle $-\delta$ are explicitly calculated as part of solving the equation system. This is mathematically possible due to the overdeterminacy or non-underdeterminacy of the equation system according to the invention. The explicit knowledge of the rotation angles $\gamma$ and $-\delta$ allows to calculate from them the alignment of the surface normal of the sample surface in the measurement region relative to the reference axis of the ellipsometer. Within the framework of a imaging method variant, it is thus possible to determine for each sample point the position of its surface normal, i.e. the overall topology of the sample surface. However, the conversion is not trivial.

The rotation angles $\gamma$ and $-\delta$ calculated by solving the equation system contain information about the relative alignment of the measured sample surface with respect to the known alignment of the sample normal in the case of a correctly aligned sample, if the following angle definition is applied:

$$\gamma = \text{sign}(\cos\phi)\cos^{-1}\left(\frac{\cos\Theta - \cos\varphi_0\cos\varphi_{eff}}{\sin\varphi_{eff}\sin\varphi_0}\right) \quad (7)$$

$$\delta = \text{sign}(\cos\phi)\cos^{-1}(\cos\delta) \quad (8)$$

with $$\cos\delta = \frac{\begin{array}{c}(\cos\varphi_0\sin\varphi_0\cos\varphi_{eff}(\cos^2\phi\sin^2\Theta + 1) + \\ (\cos\varphi_{eff}\cos\Theta + \cos\varphi_0\sin^2\varphi_0)\sin\phi\sin\Theta + \sin^3\varphi_0\cos\Theta)\end{array}}{(\sin\varphi_{eff}(\sin\varphi_0\cos\varphi_{eff}\sin\phi\sin\Theta + \cos\varphi_0\cos\varphi_{eff}\cos\Theta + \sin^2\varphi_0))} \quad (9)$$

In this context, $\varphi_0$ is the nominal angle of incidence (i.e. the angle of incidence set on the ellipsometer), $\varphi_{eff}$ is the effective angle of incidence (is equal to the actual angle of incidence), and $\Theta$ and $\Phi$ are the polar and azimuthal angles of the surface normal of the sample.

The effective angle of incidence $\varphi_{eff}$ is also a function of $\Theta$ and $\Phi$, namely:

$$\cos\varphi_{eff} = -\sin\varphi_0\sin\varphi_0\sin\varphi + \cos\varphi_0\cos\Theta. \quad (10)$$

Thus, equations (7) to (10) can be used to calculate the Mueller matrix rotation angles $\gamma$ and $\delta$ from the values of $\Theta$ and $\Phi$ and $\varphi_0$.

Equation (9) represents an approximation for the output Mueller matrix rotation angle $\delta$ (hereinafter referred to as "approximation model 1"). Strictly speaking, the approximation consists in the fact that the applied rotation matrix according to equation (4) cannot be, strictly mathematically, an exact solution for the above-mentioned output transformation matrix $M_{out}^{trans}$. However, the validity of the approximation made according to equation (9) was confirmed in experiments. Nevertheless, experimental situations are conceivable in which other approximation models for the output Mueller matrix rotation angle $\delta$ allow more accurate calculations than the approximation model 1.

Therefore, another approximation model was developed (hereafter referred to as "approximation model 2"), which motivates the rotation angle in a geometrically different way and yields the following equation for the output Mueller matrix rotation angle $\delta$:

$$\cos = \frac{(\cos\varphi_0\sin\phi\sin\Theta - \sin\varphi_0\cos\Theta)\cos2\varphi_{eff} + \sin2\varphi_0\cos\varphi_{eff})}{\sqrt{\sin^2\varphi_{eff} - [\cos2\varphi_0\cos\varphi_{eff} - \cos2\varphi_{eff}(\sin\varphi_0\sin\phi\sin\Theta + \cos\varphi_0\cos\Theta)]^2}} \quad (11)$$

with the variable designations defined above.

Thus, equations (7), (8), (10) and (11) can also be used to calculate the Mueller matrix rotation angles $\gamma$ and $\delta$ from the values of $\Theta$ and $\Phi$ as well as $\varphi_0$.

If, on the other hand, one has determined $\gamma$ and $\delta$ with a known (because set) $\varphi_0$ when making a measurement, then the above equations (7) and optionally (9) or (11) form a system of equations consisting of two equations in the two unknowns $\Theta$ and $\Phi$. Thus, by solving this equation system, one determines the polar and azimuthal angles of the surface normal and thus the alignment of the surface normal relative to the laboratory coordinate system.

Further details and advantages of the invention can be seen in the following special description and drawings.

DETAILED DESCRIPTION

FIGS. 1 to 5 are intended to illustrate and check the geometric plausibility of variables relevant in the context of the present invention.

Figure 1:
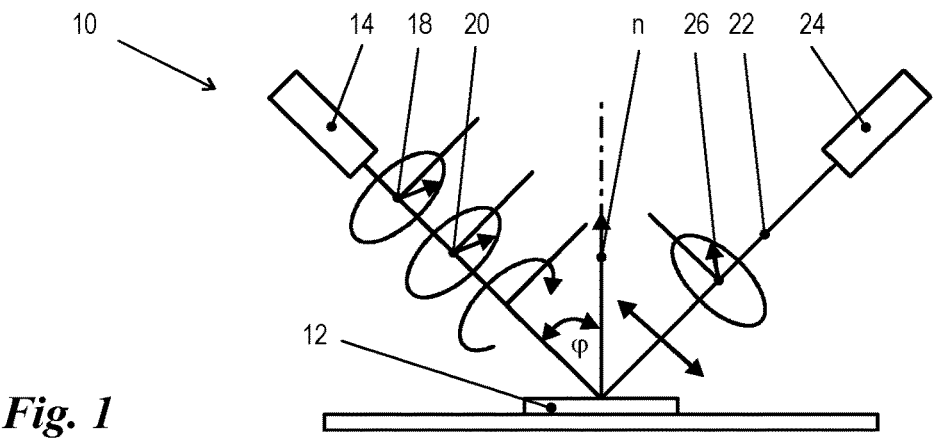
FIG. 1 is a diagram of the basic design of an ellipsometer.

FIG. 1 shows the basic design of an ellipsometer 10 as it is known from prior art and can also be used within the scope of the present invention. A sample 12 with a surface normal n is illuminated by a light source 14 with an input beam $k_{in}$ (illumination beam). The incident input beam $k_{in}$ assumes an angle of incidence $\varphi$ to the sample normal n. By means of a polarizer 18 and a downstream compensator 20, the incident input beam $k_{in}$ is given a defined, adjustable polarization state. After reflection from the surface of the sample 12, the light is fed to a detector 24 in the form of detection beam $k_{out}$. The polarization state of the light has changed due to reflection from the sample surface in a way that is characteristic of the physical properties of the sample, such as a coating thickness and/or optical refractive index. Upstream of the detector 24, the output beam $k_{out}$ (detection beam) is passed through an analyzer 26, the variable setting of which affects the polarization-dependent intensity reaching the detector 24.

The diagram of FIG. 1 shows a non-imaging ellipsometer 10. An imaging ellipsometer differs from this only in having imaging optics between the sample 12 and the analyzer 26, or optionally between the analyzer 26 and the detector 24, and in having an imaging detector 24.

Figure 2:
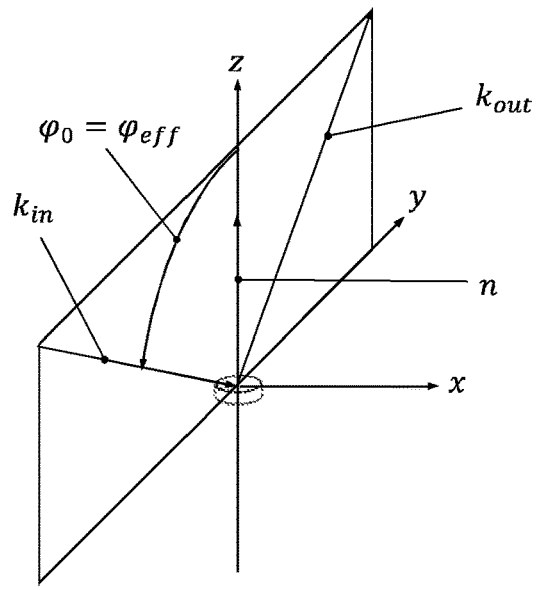
FIG. 2 is a diagram illustrating a sample correctly aligned in the conventional manner.

FIG. 2 shows in even more schematic form the geometric relationships within an ellipsometer 10 when the sample 12 is "correctly" aligned in the usual manner. The reference axis of the ellipsometer 10, denoted here by z, coincides with the sample normal n. At the same time, the input beam $k_{in}$ and the output beam $k_{out}$ run in a common plane, namely the yz-plane. With this alignment of the sample, the actual angle of incidence $\varphi_{eff}$, which the input beam $k_{in}$ assumes in relation to the sample normal n, is identical with the nominal angle of incidence $\varphi_0$, which the input beam $k_{in}$ assumes in relation to the reference axis z of the ellipsometer 10.

Figure 3:
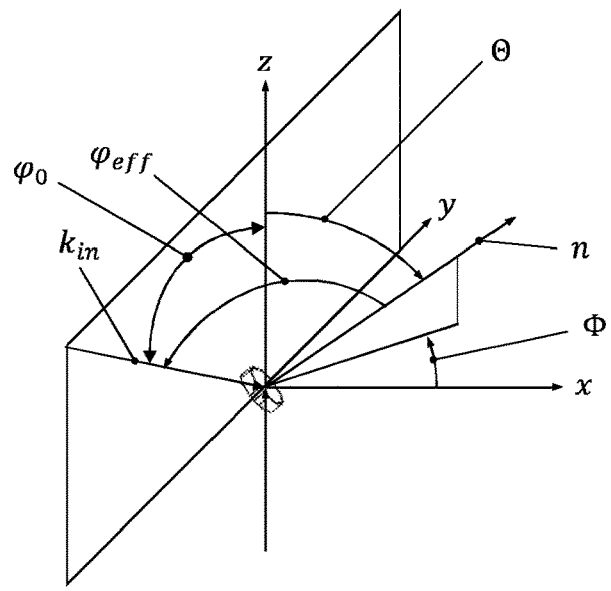
FIG. 3 is a diagram illustrating a sample aligned in tilted manner.

The situation is different for the tilted alignment of the sample 12 outlined in FIG. 3. The diagram of FIG. 3 can also be applied to curved sample surfaces in that each curved surface can be thought of as a grid of very small, tilted surfaces. In the case of a tilted sample surface, the actual angle of incidence $\varphi_{eff}$ and the nominal angle of incidence $\varphi_0$ diverge, the sample normal n no longer coincides with the reference axis z of the ellipsometer 10. The alignment of the sample normal n can be described in the intrinsic system of the ellipsometer 10 with the polar angle $\Phi$ and the azimuthal angle $\Theta$.

Figure 4:
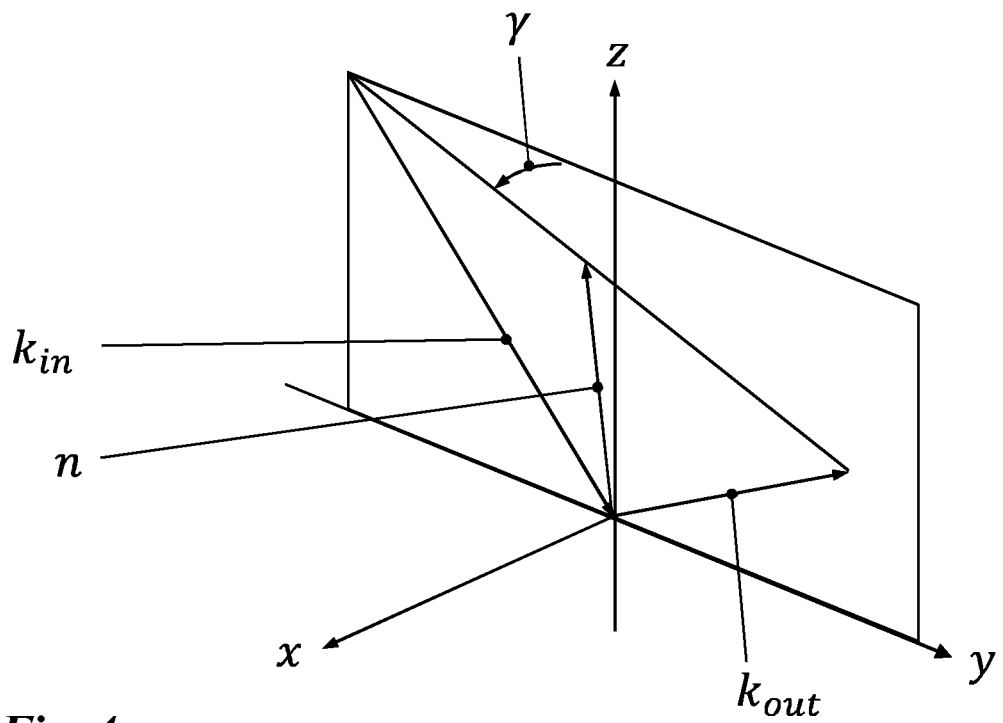
FIG. 4 is a diagram illustrating the input rotation angle $\gamma$.

FIG. 4 is a sketch to illustrate and check the plausibility of the input rotation angle $\gamma$ discussed in the preceding description of the invention. $\gamma$ corresponds to the angle by which the actual plane of incidence, i.e. the plane created by the input beam $k_{in}$ and the actual output beam $k_{out}$, is tilted in relation to the nominal plane of incidence, i.e. the yz-plane of the ellipsometer (calibration plane), as measured in the plane perpendicular to the input beam $k_{in}$.

Figure 5:
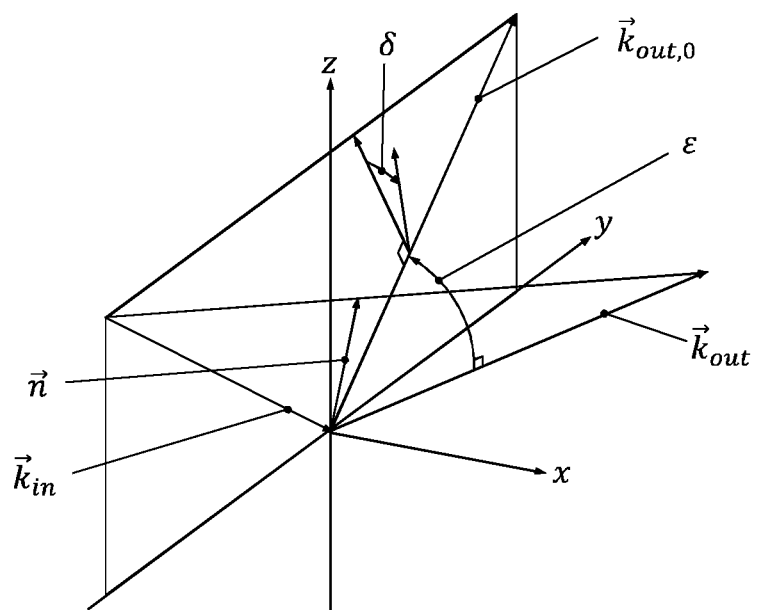
FIG. 5 is a diagram illustrating the output rotation angle $\delta$ according to approximation model 1.

FIG. 5 serves to illustrate and check the plausibility of the output rotation angle $\delta$ according to approximation model 1 discussed in the description above. $\delta$ corresponds to the angle by which the "virtual output plane" defined below is tilted in relation to the nominal output plane, i.e. the plane in the case of the correctly aligned sample, as measured in the plane perpendicular to the nominal output beam $k_{out,0}$. The "virtual output plane" corresponds to the plane created by the nominal output beam $k_{out,0}$ and that vector which would be obtained from the sample normal n if the latter were mentally carried along as a rigid body during a three-dimensional rotation of the actual output beam $k_{out}$ onto the nominal output beam $k_{out,0}$.

Figure 6:
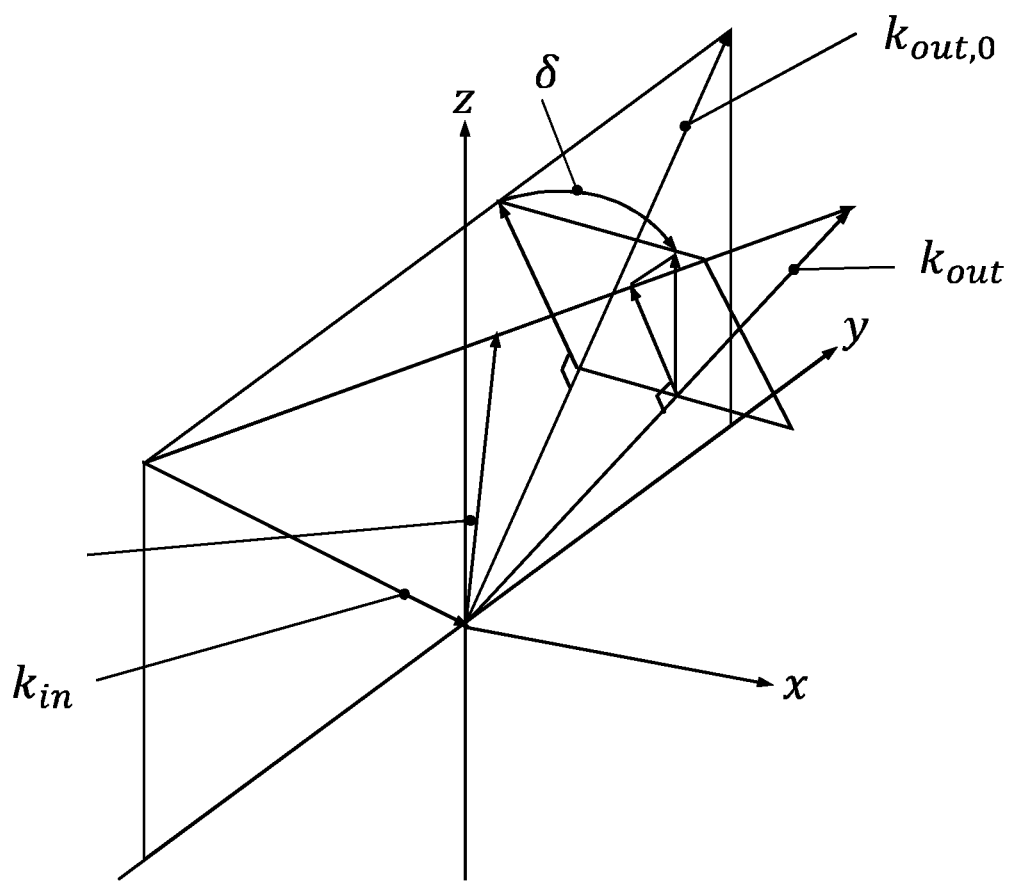
FIG. 6 is a diagram illustrating the output rotation angle $\delta$ according to approximation model 2.

FIG. 6 serves to illustrate and check the plausibility of the output rotation angle $\delta$ according to the approximation model 2 discussed in the above description. $\delta$ corresponds to the angle which the auxiliary vector defined below forms with the nominal output plane, i.e. the plane in the case of the correctly aligned sample, as measured in the plane perpendicular to the nominal output beam $k_{out,0}$. In this case, said auxiliary vector is obtained from the vector perpendicular to the output beam $k_{out}$ and lying in the actual output plane, by projection onto said plane, in which $\delta$ is measured, projected along the direction of the nominal output beam $k_{out,0}$.

REFERENCE SYMBOL LIST

10 Ellipsometer
12 Sample
14 Light source
18 Polarizer
20 Analyzer
24 Detector
$k_{in}$ Input beam
$k_{out}$ Output beam
$k_{out,0}$ Nominal output beam
n Sample normal
$\varphi$ Angle of incidence
$\varphi_0$ Nominal angle of incidence
$\varphi_{eff}$ Actual angle of incidence
$\Phi$ Polar angle
$\Theta$ Azimuthal angle
$\gamma$ Input rotation angle
$-\delta$ Output rotation angle
x, y, z Cartesian coordinates of the ellipsometer intrinsic system

The invention claimed is:

1. A method for determining properties of a sample (12) by ellipsometry, comprising the steps of:
providing an ellipsometer (10) having a reference axis (z), positioning the sample (12) in the ellipsometer (10) so that a surface normal (n) of a measurement region of the sample surface is tilted relative to the reference axis (z) of the ellipsometer (10),
measuring a Mueller matrix for the measurement region, creating an equation system that is not underdetermined, the equation system equating the measured Mueller matrix to a matrix product formed of
a rotation matrix about an input rotation angle ($\gamma$),
an isotropic Mueller matrix in normalized NCS form and
a rotation matrix about an output rotation angle ($-\delta$) that is applied independently of the input rotation angle ($\gamma$), and
solving the equation system for the parameters representing the sample properties to be determined.

2. The method of claim 1, wherein as part of solving the equation system, the Mueller parameters N, S, C and/or the ellipsometric transfer variables $\Delta$ and $\Psi$ equivalent to these are explicitly calculated.

3. The method of claim 2, further comprising the step of: determining optical and/or mechanical sample properties from the calculated ellipsometric transfer variables $\Delta$ and $\Psi$ by a numerical error minimization method by variation of parameters of a sample model.

4. The method of claim 3, wherein as part of the error minimization method the angle of incidence ($\varphi$) is used as an additional parameter to be varied.

5. The method of claim 1, wherein as part of solving the equation system, the input rotation angle ($\gamma$) and the output rotation angle ($-\delta$) are calculated explicitly.

6. The method of claim 5, wherein the rotation angles ($\gamma$, $-\delta$) determined by solving the equation system are used to calculate the alignment of the surface normal (n) of the sample surface in the measurement region relative to the reference axis (z) of the ellipsometer (10).

7. The method of claim 1, wherein the solving of the equation system is performed by a numerical error minimization method by variation of parameters of a sample model.

8. The method of claim 1, wherein the ellipsometer (10) is an imaging ellipsometer (10).

9. The method of claim 8, wherein the sample surface is curved, the step of solving the equation system for the parameters representing the sample properties includes calculating the input rotation angle ($\gamma$) and the output rotation angle ($-\delta$), and the method further comprising creating maps by solving the equation system pixel by pixel for each of plural reference points on the curved surface and assigning ellipsometric transfer variables $\Delta$ and $\Psi$ to each of the reference points.

10. The method of claim 1, wherein the sample has a plurality of measurement regions on the measurement surface, the steps of the method are carried out for at least two of the plurality of measurement regions, and the method further comprising creating at least one map comprised of the parameters representing the sample properties at the at least two measurement regions.

* * * * *